United States Patent [19]

Igarashi et al.

[11] Patent Number: 5,021,677

[45] Date of Patent: Jun. 4, 1991

[54] LIGHT-SCATTERING-TYPE SMOKE DETECTOR

[75] Inventors: Yoshinori Igarashi; Makoto Yasukawa; Yasuo Ariga; Ichiro Kobayashi; Satoru Horiuchi, all of Tokyo, Japan

[73] Assignee: Nohmi Bosai Kabushiki Kaisha, Tokyo, Japan

[21] Appl. No.: 515,181

[22] Filed: Apr. 26, 1990

[30] Foreign Application Priority Data

May 2, 1989 [JP] Japan .................................. 1-51617
May 2, 1989 [JP] Japan .................................. 1-112034
May 12, 1989 [JP] Japan .................................. 1-53918

[51] Int. Cl.[5] .................................. G01N 15/06
[52] U.S. Cl. .................................. 250/574; 340/630
[58] Field of Search ................ 250/573, 574; 356/338, 356/340, 341, 438; 340/630

[56] References Cited

U.S. PATENT DOCUMENTS 4,216,377 8/1980 Hasegawa et al. ............... 250/57 H
4,269,510 5/1981 Horvath et al. .................... 250/574

*Primary Examiner*—David C. Nelms
*Assistant Examiner*—Khaled Shami
*Attorney, Agent, or Firm*—Amster, Rothstein & Ebenstein

[57] ABSTRACT

A light-scattering-type smoke detector is disclosed which comprises a base portion to be secured to a ceiling, a head part forming one of the parts of a detecting portion to be detachably mounted to the base portion through setscrews passed therethrough, and a dark box forming the other of the portions of the detecting part to be detachably connected to the head part by screwing the setscrews thereto, the dark box comprising a body portion and a cover portion put one upon another. The body portion has a printed circuit board integrally secured thereto on its upper surface and the dark box is surrounded by a labyrinth around its outer periphery that is internally provided with a light projection element and a light receiving element. The smoke detector allows the dismounting of the head part from the base portion, and the dark box from the head part so that maintenance and repair of the smoke detector can be carried out quite easily.

6 Claims, 6 Drawing Sheets

FIG. 5A
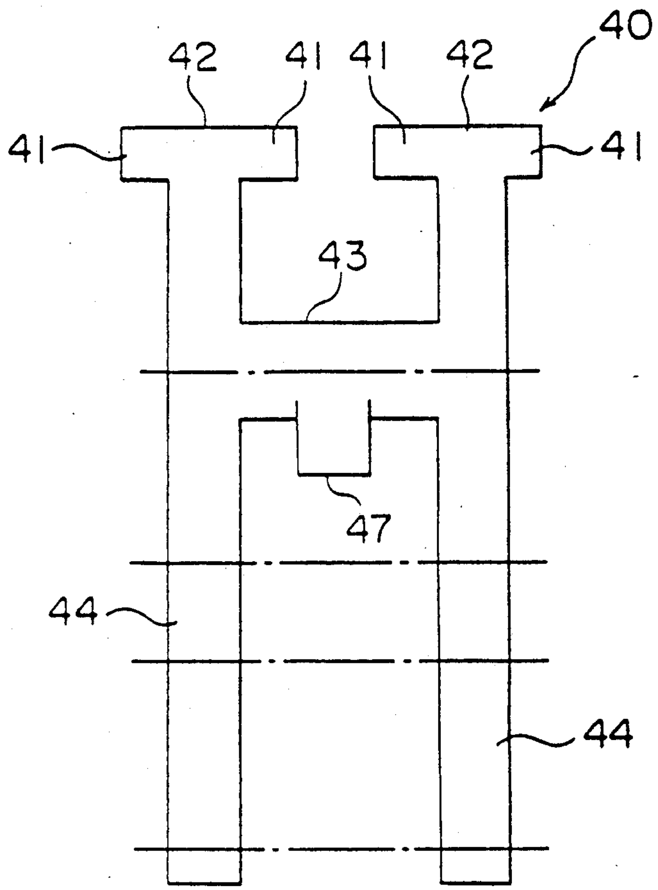
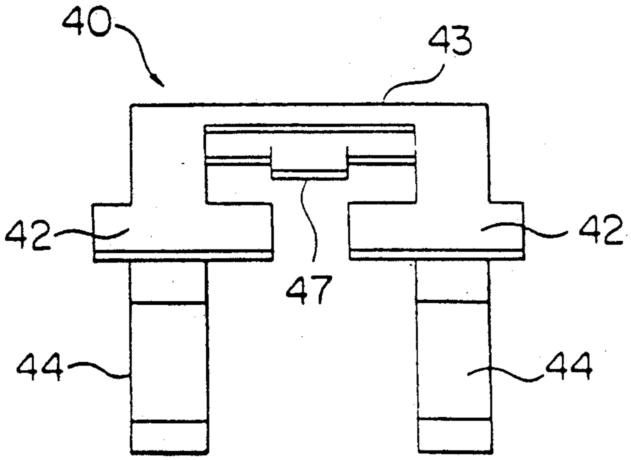
FIG. 5B
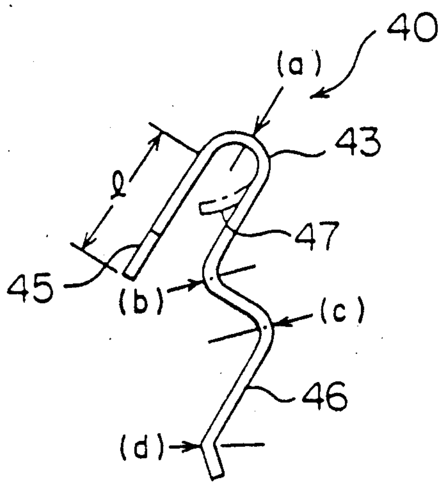
FIG. 5C

LIGHT-SCATTERING-TYPE SMOKE DETECTOR

FIELD OF THE INVENTION

The present invention relates to a smoke detector, and more particularly a light-scattering-type smoke detector which detects a fire by utilizing light diffusion.

BACKGROUND OF THE INVENTION

Hitherto, among conventional light-scattering-type smoke detectors, there are those which in order to keep an electrical circuit portion hermetically sealed, the detecting portion is constituted so that a printed circuit board is introduced into the head part of the cylindrical detector having a cover, a dark box provided with light projecting and light receiving elements as well as a labyrinth is put over the head part to be screwed thereto and fixed by adhesives, and after a dark box cover is mounted on the dark box the dark box is surrounded by a detector cover.

The conventional smoke detector having such a constitution is advantageous in that its overall construction can be made compact, the constitution is simple and it can be hermetically sealed from the outside. However, since the dark box is secured to the head part by adhesives it is not possible to easily inspect or repair the detector by disassembling it once it has been assembled. There are other problems in that inspection of the electrical circuit can not be easily carried out.

SUMMARY OF THE INVENTION

Therefore, it is one of the objects of the present invention to provide a light-scattering-type smoke detector which can solve the problems inherent to conventional detector as described above.

It is another object of the present invention to provide a light-scattering-type smoke detector which has a simple construction, allowing disassembly of a detection part from the head part to inspect the printed circuit board, dark box, etc. within the detecting part, and allows easy assembly, maintenance, inspection, etc.

In accordance with the present invention a light-scattering-type smoke detector is provided which comprises a base portion to be secured to a ceiling, a detection portion consisting of a head part to be secured to the base portion by setscrews which serve both as input-/output terminals and fastening metal fittings, and a dark box composed of a lower portion and an upper portion put one upon another with the upper portion having an integral printed circuit board to be disposed within the head part, and a cover for the dark box, whereby all of the parts are made to be disassemblable.

The light-scattering-type smoke detector having such a constitution operates as follows. The printed circuit board having electrical elements mounted thereon is set on the upper portion of the dark box, and lead wires of the light projecting and light receiving elements are soldered to the printed circuit board to be integrated therewith. Upon insertion of the printed circuit board integrated with the upper portion of the dark box into the stepped portion of the head part of the detecting portion, the projected flange of the upper portion of the dark box is engaged in the hooks in the head part so that the printed circuit board and the upper portion of the dark box are mounted on the head part. Subsequently, the setscrews passed through the through-holes formed in the head part are screwed to the conductor of the printed circuit board to secure it to the head part. Upon mounting the cover of the dark box after the lower portion of the dark box is put on the upper portion, the assembly of the detecting portion is completed. When the flange of the setscrews which are exposed on the assembled detecting portion are engaged by the terminals of the base portion in which the wiring has been completed, then the light-scattering-type smoke detector can be mounted on the ceiling.

BRIEF DESCRIPTION OF THE DRAWINGS

These and other objects of the present invention and its advantages will be more clearly understood upon reference to the specification and the appended drawings in which:

FIG. 5 is a view of the terminal spring shown in FIG. 1 in which (A) shows its original state before bending, (B) a front elevational view after bending, and (C) a view of the spring shown in (B) when it is viewed from the right hand side of (B);

DETAILED DESCRIPTION OF THE INVENTION

Figure 1:
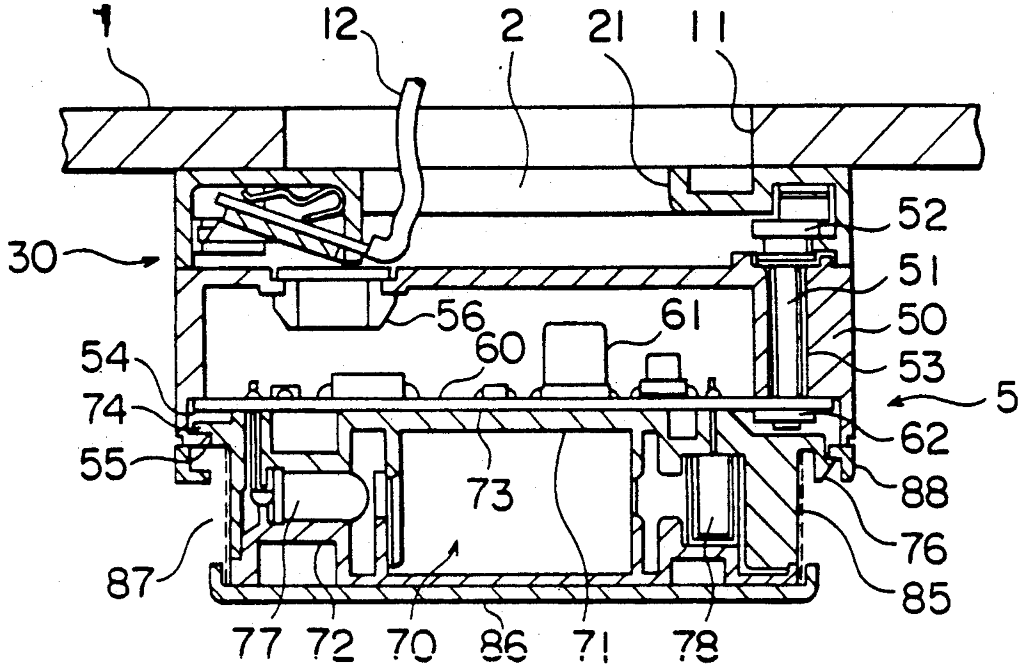
FIG. 1 is a vertical sectional view showing the constitution of one embodiment of the present invention.
Figure 2:
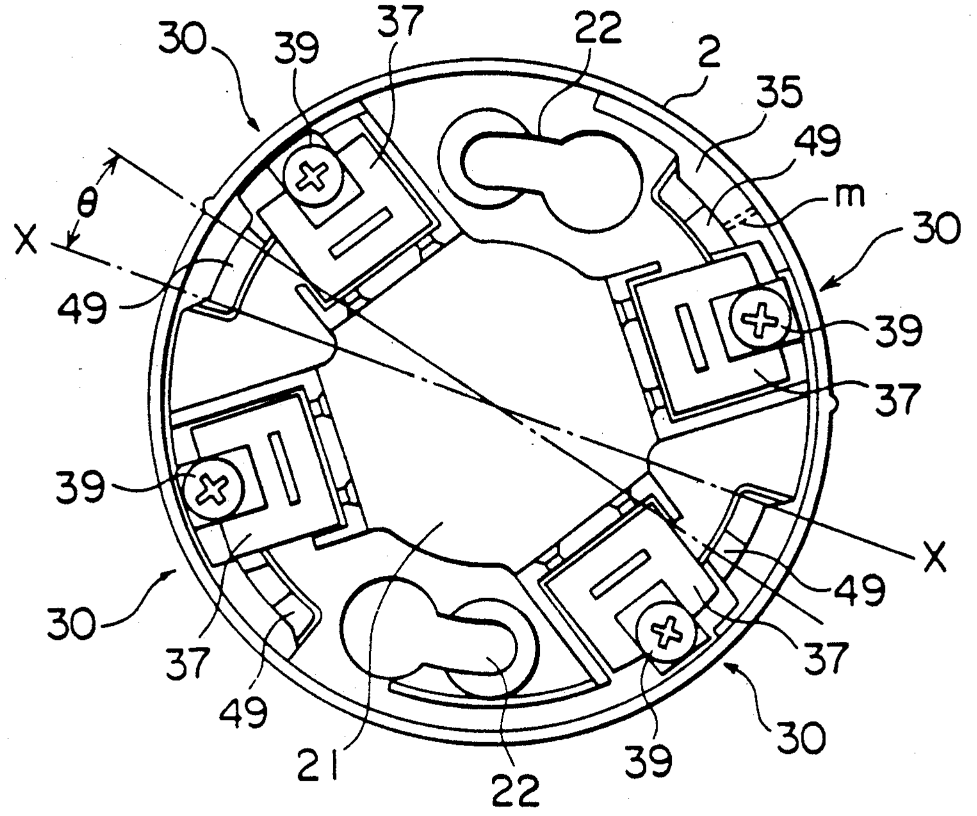
FIG. 2 is a bottom view of the base part shown in FIG. 1 to indicated its constitution.
Figure 3:
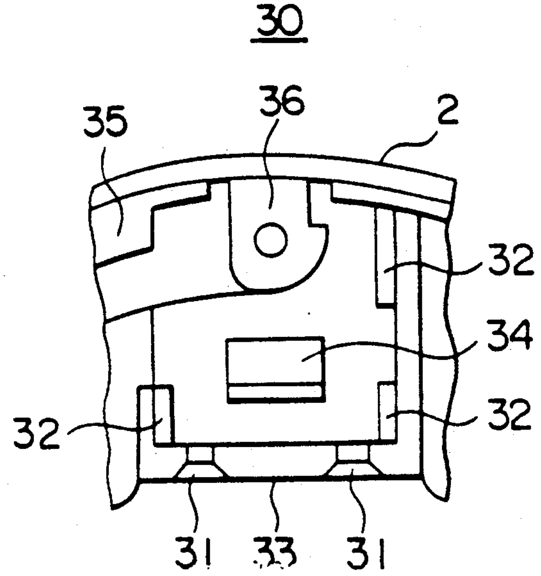
FIG. 3 is a view showing an essential portion of FIG. 2 in a larger scale.

Referring now to FIGS. 1 to 3 wherein the reference numeral 1 designates a ceiling, 11 an opening formed in the ceiling 1, and 12 is wiring. A base part 2 of the smoke detector in accordance with present invention, is secured to the ceiling 1 which has substantially a cylindrical form made of a molded plastic resin with the top being closed by a cover, 21 is a opening formed in the base portion 2 in its top cover, and 22 are key-shaped holes for securing the base portion 2 to the ceiling 1.

Figure 4:
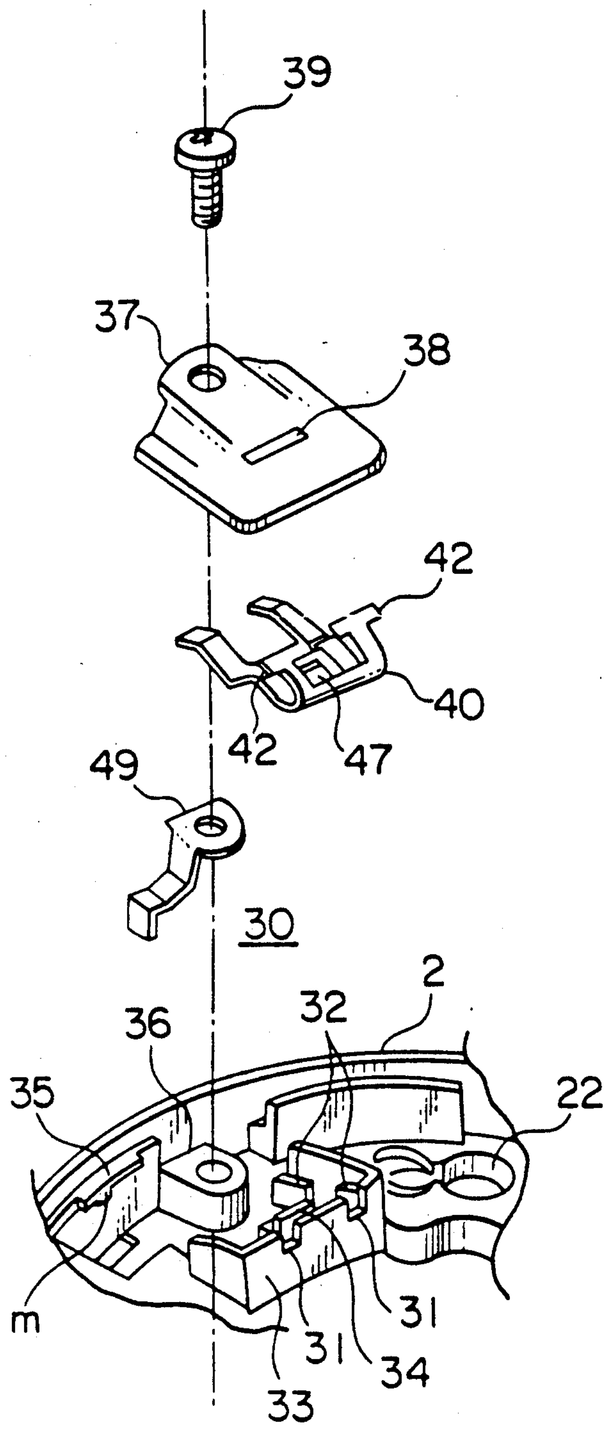
FIG. 4 is a perspective exploded view of the terminal portion shown in FIGS. 1 and 2.

Terminal portions 30 are formed inside the base portion 2 at four positions of the top cover. As shown in FIGS. 3 and 4, at positions corresponding to the respective terminal portions 30 of the base portion 2 a rectilinear wall 33 having two insertion grooves 31 and inclined steps 32 is formed, a pedestal 34, an arcuate engaging edge or claw 35 provided with a protrusion m on its underside, and a mounting seat 36 formed with a threaded hole. A terminal plate 37 is formed with a detaching hole 38 and 39 is a fastening screw, with 40 being a terminal spring.

As shown also in FIG. 5, the terminal spring 40 is made of an H-shaped thin spring sheet having two head portions 42 each having a lug 41 at each end, two parallel leg portions 44, and a connecting portion 43 to connect the two leg portions 44 together, and the sheet is bent at the connecting portion 43 in a hairpin-like shape. The bent leg portions 44 are respectively further bent twice so as to have two wavy steps. Thus, the overall cross sectional shape of the terminal spring 40 has a substantially inverted U-shaped form with one longer leg as shown in FIG. 5(C). In this case, the head portions 42 serve as engaging pieces 45 each with the hairpin-like portion forming a main curved portion a, the first and the second bent portions serving as subcurved portions b and c, respectively, and the adjacency of the third curved portion d serve as contacting pieces 46. A projecting piece 47 is formed at the connecting portion 43 centrally, acting as a stopper to temporarily hold the terminal spring 40 when it is mounted on the terminal portion 30 and 49 is a terminal piece (See FIGS. 2 and 4).

Turning now again to FIG. 1 wherein the reference numeral 5 indicates a detecting portion the frame of which is all molded plastic resin as in the base portion 2, and which comprises a head part, a printed circuit board, a dark box comprising an upper portion and a lower portion arranged one upon another, and a cover, etc. to be described later. The head part 50 constitutes one of the portions of the detecting portion 5 and has a hollow cylindrical form with its top end being closed by a wall (See also FIG. 6).

Four setscrews 51 are formed at their upper ends with flanges 52, and through-holes 53 pass through the head part 50 vertically. The through-holes 53 are adapted to be passed through by the setscrews 51, respectively. An annular stepped portion 54 is formed around the inner periphery of a lower portion of the head part 50, a plurality of hooks 53 are formed at the lower end periphery of the head part 50, an elastic cap 56 for test terminals is fit in the top cover of the head part 50, and arcuate guide walls 57 project from the upper surface of the top cover of the head part 50.

Provided with the printed circuit board 60 constituting a circuit portion, are circuit elements 61 such as resistors, capacitors, etc. mounted on the upper surface of the printed circuit board 60, a conductor 62 having a threaded hole to screw on the lower part of setscrew 51, and a confirmation lamp 63. The conductor 62 is secured to the printed circuit board 60 to constitute a portion of a detecting circuit. The confirmation lamp 63 is suspended from the printed circuit board 60 so as to be visible from the outside, and is here an LED.

Figure 7:
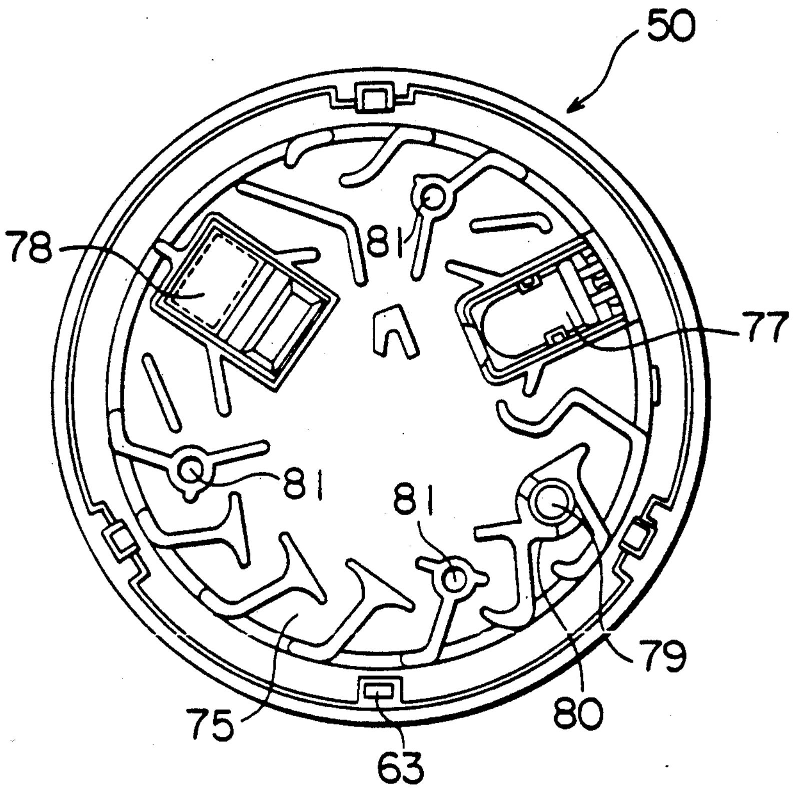
FIG. 7 is a bottom view of the upper portion of the dark box shown in FIGS. 1 and 2.
Figure 8:
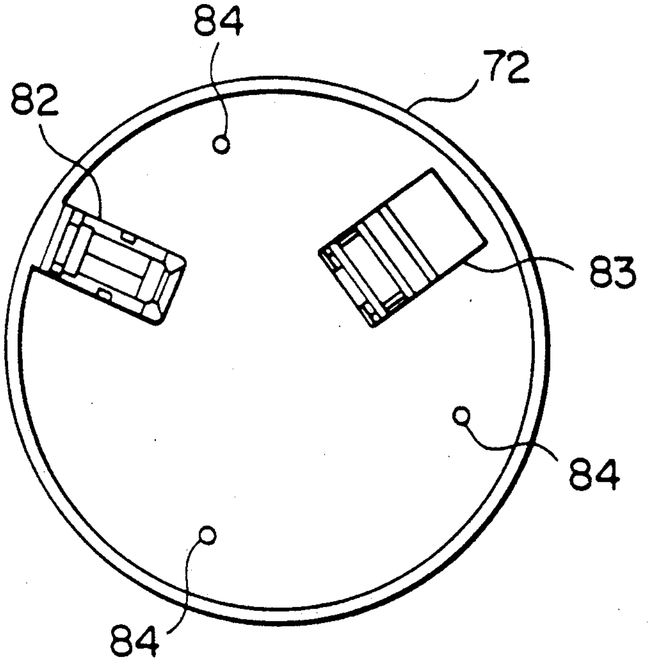
FIG. 8 is a plan view of the lower portion of the dark box shown in FIGS. 1 and 2.
Figure 10:
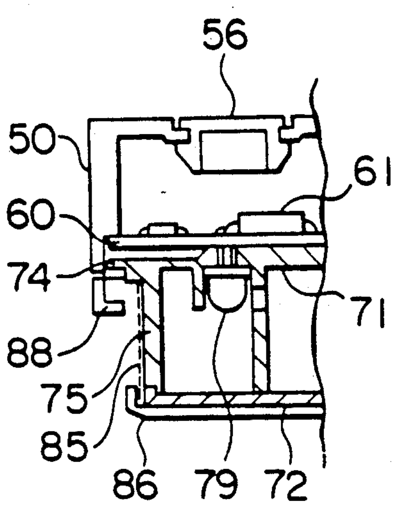
FIG. 10 is a cross sectional view of a part of the detecting portion shown in FIGS. 1 and 2.

The dark box 70 is made of a molded black plastic resin material which comprises a dark box body or upper portion 71 integral with the printed circuit board 60 and a cover body or lower portion 72 to be mounted on the dark box body 71 from below. A pushing portion 73 is formed on the upper surface of the dark box body 71 so as to slightly project upwards therefrom , and a projecting flange 74 is formed around the outer periphery of the dark box body 71 near its upper portion so as to engage with hooks 55 formed in the head part 50 around its lower end periphery. In FIG. 7 the reference numeral 75 is a labyrinth constituted by a plurality of light-shielding columns, formed at the periphery of the dark box body 71 at the under surface of its top cover. The labyrinth 75 is so constituted that although it allows the surrounding air or smoke to enter into the inside of the dark box 70, it prevents the light from entering thereinto from the outside. Key-like formed claws 76 are for the cover body 72 of the dark box 70, and 77 and 78 are a light projecting element and a light receiving elements, respectively, 79 is a test lamp using a light emitting diode (See also FIG. 10), 80 is a light-shielding column surrounding the test lamp 79, and 81 are positioning holes. The light-shielding column 80 comprises paired two light-shielding columns each having a J-shaped special configuration and constituting a part of the labyrinth 75, surrounding the test lamp 79. Protruded pieces 82 and 83 project from the inner surface of the cover body 72 (See also FIG. 8), with three locating pins 84 also projecting therefrom. The protruded pieces 82 and 83 face the light projecting elements 77 and the light receiving element 78, respectively, and the pins 84 correspond to the positioning holes 81, respectively. The dark box body 71 and the cover body thereof 72 are secured together such that after the pins 84 are inserted into the positioning holes 81 they are relatively moved upwards or downwards, and the light projecting element 77 and the light receiving element 78 are housed in a chamber having windows and located within the dark box 70. The optical axes of the light projecting element 77 and the light receiving element 78 housed within the chamber intersect near the region beyond the light shielding columns, constituting the labyrinth 75, each having substantially a J-shaped configuration. Therefore, in a normal state clean air containing no smoke particles flows into the dark box 70 the light from the light projecting element 77 is not received by the light receiving element 78.

Figure 9:
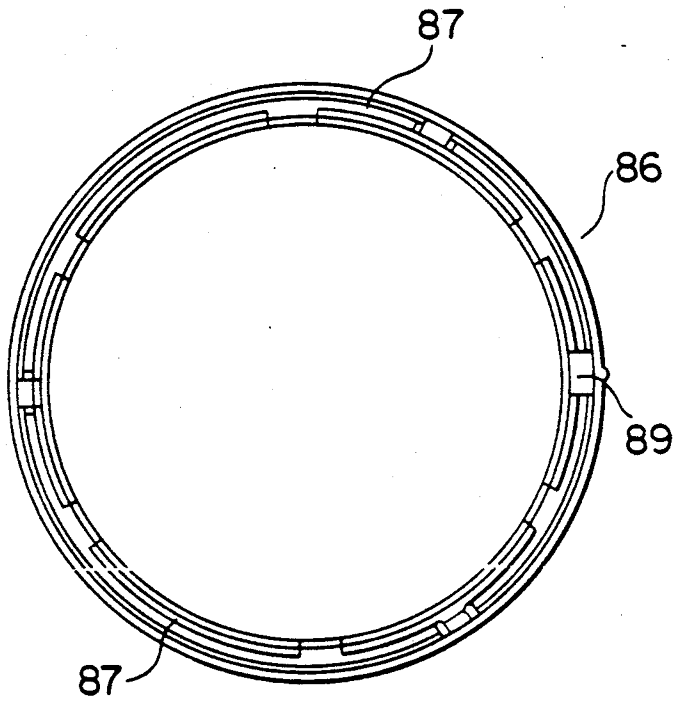
FIG. 9 is a plan view of the cover of the detecting portion shown in FIGS. 1 and 2.

A screen 85 provided for preventing the entry of insects is made of a thin metal sheet, and a cover 86 for the detecting part 5 is provided around the screen 85. The screen 85 is made in a band-like configuration, and it is constituted so as to form a cylindrical shape with the projections formed at one of the ends being inserted into narrow insertion grooves formed at the other end correspondingly. Air flow passages formed 87 are in the cover 86 as are 88 hooks to engage the key-shaped claws 76, and 89 is an insertion hole to insert the confirmation lamp 83 ( See FIG. 9). The cover 86 covers the dark box 70 from below with the engaging hooks 88 engaging the engaging claws 76 and the screen 85 for preventing the entry of insects put therebetween.

Figure 11:
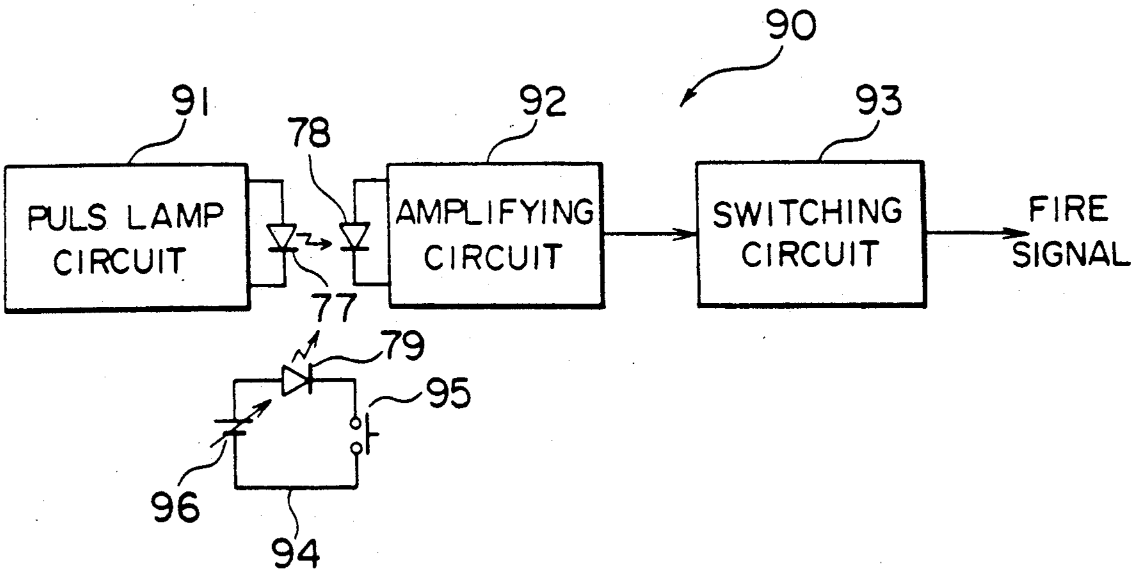
FIG. 11 is a diagram showing the electrical circuit of the detecting portion shown in FIGS. 1 and 2.

FIG. 11 is a block diagram showing the detecting circuit 90 of the detecting portion 5 where 91 is a pulse lamp circuit for the light projecting element 77, 92 an amplifying circuit to amplify the output of the light receiving element 78, and 93 is a switching circuit. The switching circuit 93 comprises a threshold circuit, an SCR, etc. and 94 is a test circuit to light the test lamp 79 which comprises e.g. a test switch 95 adapted to be controlled from the receiver side and an electrical source 96 for testing.

The light-scattering-type smoke detector in accordance with the present invention, having a constitution as described above is assembled in a manner as described below:

One of the shaped terminal springs 40 is inserted into one of the rectilinear walls 33 of the terminal portions 30 in the base part 2 shown in FIGS. 3 and 4 with the terminal spring 40 being laid on the terminal piece 49 previously laid on the terminal portion 30. In this case, the terminal spring 40 is temporarily held to the terminal portion 30 with the projecting piece 47 elastically abutting the receiving pedestal 34. On the terminal spring 40 thus held temporarily one of the terminal plates 37 is laid, and one of the fastening screws 39 is screwed into the threaded hole of one of the mounting seats 36 so that the terminal plate 37 is secured in a slant state along the sloped steps 32, thus mounting one of the terminal portions 30. Similarly, the other three terminal portions have the terminal springs 40 and the terminal pieces 49, respectively, mounted therein. In the state of the mounting of the terminal spring 40, both head portions 42 come near the introduction grooves 31, respectively, and the vicinities of the end portions of the engaging pieces 45 confront the detecting hole 38 formed in the terminal plate 37.

The base portion 2 in the terminal portions 30 of which the terminal plates 37, etc., have thus been assembled may be mounted on the ceiling 1 about a ceiling opening 11 by screwing fastening screws through two fastening holes 22 into the ceiling, respectively, with the base portion 2 being rotated in a clockwise direction as viewed in FIG. 2. Upon mounting the base portion 2, the wiring 12 is let down through the ceiling opening 11 and drawn down through the opening 21 of the base portion 2. The core wires of the wiring 12 thus drawn down are inserted into the terminal portion 30 through the insertion grooves 31. When the core wires of the wiring 12 are inserted into the grooves 31 the ends of the core wires travel further along the terminal plate 37 with the engaging pieces 45 of the terminal springs 40 being pressed down. On pushing the wiring 12 further the contacting pieces 46 of the terminal spring 40 are abutted so that the core wires are held between the terminal plate 37 and the contacting pieces 46 under the action of the terminal spring 40. The state of the wiring 12 is shown in FIG. 1. In this case, the wiring 12 is held by the ends of the engaging pieces 45 which theoretically generate a strong spring force owing to the shortness of the length 1 from the principal curved portion a, as seen in FIG. 5(*c*), but present a broad elastic displacement through the sub-curved portions b and c, whereby electrical conduction is attained by a relatively small spring pressure. Therefore, the spring pressure of the terminal spring 40 is effectively utilized. Further, since the wiring 12 drawn down is inserted obliquely upwards from below the slanted terminal plate 37 the wiring operation can be carried out quite easily without having to unduly crane one's neck during installation on the ceiling 1. With a similar operation the other wiring 12 may be inserted through the other insertion grooves 31. Thus, the connection of the wiring 12 to the terminal portions 30 for input to and output from them is completed.

When the engaging piece 45 is pushed down by a screwdriver for example, inserted through the detaching hole 38 of the terminal plate 37 the core wire is released therefrom so that the wiring 12 can be drawn out through the insertion groove 31 of the terminal portion 30. In this case, the terminal spring 40 deforms at many portions including the sub-curved portions b and c in addition to the principal curved portion a. As a result, the deformation is distributed so that the large deformation due to the external force can be achieved, substantially no plastic deformation of the engaging pieces 45 of the terminal spring 40 occurring.

Figure 6A:
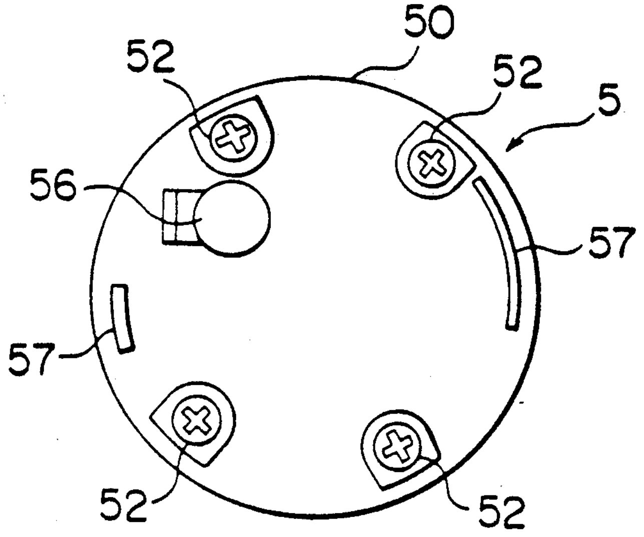
FIG. 6 is a view of the detecting portion shown in FIGS. 1 and 2 in which (A) is plan view, (B) a side elevational view, and (C) a bottom view.
Figure 6B:
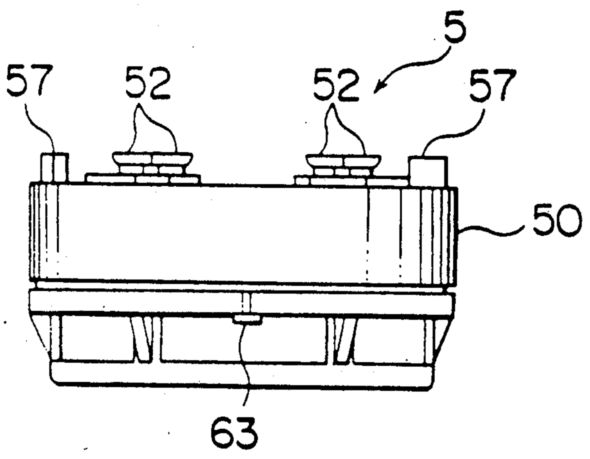
Figure 6C:
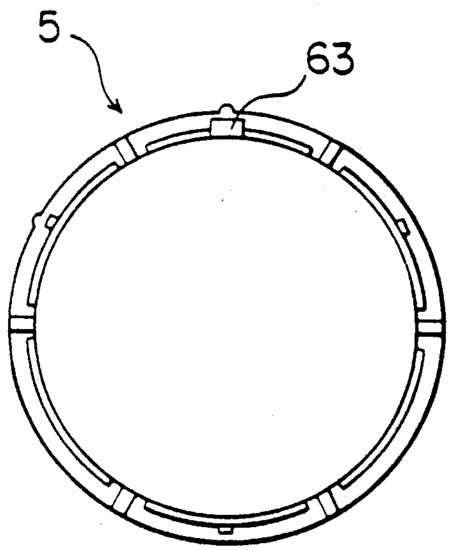

Before or after the connection of the wiring 12 to the base portion 2, the assembly of the detecting portion 5 is carried out in the following manner:

The body 71 of the dark box 70 is laid on the surface of the printed circuit board 60 under the upper surface on which the circuit elements such as chip members, etc., have previously been mounted, and the respective lead receiving element 78 and test lamp 79 all contained in the chamber of the dark box body 71 are drawn out therefrom, respectively, onto the upper surface of the printed circuit board 60. The lead wires thus drawn out are soldered on the upper surface of the printed circuit board 60, whereby the dark box body 71 and the printed circuit board 60 are integrated. The printed circuit board 60 integrated with the dark box body 71 is put into the head part 50 constituting one of the parts of the detecting portion 5 from below. The periphery of the printed circuit board 60 together with the dark box body 71 is forced into the stepped portion 54 of the head part 50 so that the projecting flange 74 of the printed circuit board 60 engages the hooks 55 formed on the head part 50. Thus, the dark box body 71 is secured to the underside of the head part 50 together with the printed circuit board 60 owing to the engagement of the projecting flange 74 and the hooks 55. Subsequently, after the four setscrews 51 have been inserted through the through-holes 53 formed in the head part 50 they are screwed into the conductors 62 secured to the printed circuit board 60, respectively, to be secured thereto. In this case, the printed circuit board 60 is made to fit somewhat tightly into the head part 50 so that the pressing face 73 of the dark box body 71 pushes the under surface of the printed circuit board 60. As a result, by the pushing of the pressing face 73 and the fastening of the four setscrews 51 the periphery of the elastic printed circuit board 60 tightly abuts the stepped portion 54, making it possible to hermetically seal the electrical circuit portion within the head part 50. Thereafter, the pins 84 are respectively inserted into the three positioning holes 31 at the side of the dark box body 71, respectively, and the cover body 72 of the dark box 70 is put on the dark box body 71. Succeedingly, upon mounting the screen 85 for keeping out insects and the cover 86 of the detecting portion 5, the engaging pieces 88 of the cover 86 snap down around the key-shaped claws 76 of the dark box body 71, the detecting portion 5 being thus assembled. The appearance of the assembled detecting portion 5 is shown in FIGS. 6(A).(B) and (C).

The detecting portion 5 thus assembled is mounted on the base portion 2 from below, the base portion 2 already having the connection to the wirings 12 completed. Similar to the previously described mounting of the printed circuit board 60 the mounting or dismounting of the detecting portion 5 to or from the base part 2 is also carried out by inserting it from below and rotating it relative to the base portion 2. However, when inserting the detecting portion 5 (or its head part 50) into the base part 2 the setscrews 51 fix them together and make the electrical connection between them.

That is, the setscrews 51 are positioned so as to be on the line X—X diametrically connecting the ends of the terminal pieces 49 as shown in FIG. 2 and the detecting portion 5 is pushed upwards. The detecting portion 5 is then rotated clockwise by an angle as viewed in FIG. 2 relative to the base portion 2 and in this state the flanges 52 of setscrews 51 go beyond the projections m of the arcuate engaging edges 35, the detecting portion 5 fitting between the engaging edges 35 and the terminal pieces 49 owing to their elasticity so that the detecting portion 5 is rigidly mounted on the engaging edges 35. In this case, the guide walls 57 on the upper surface of the head part 50 guide the detecting portion 5 with the mounting position thereof being determined by the guide walls 57 and the projections m act to prevent the flange 52 from falling out. The electrical circuit portion of the detecting portion 5 having been mounted to the base portion 2 electrically connected to the wiring 12 through the terminal springs 40, terminal pieces 48, setscrews 51, conductors 62 and the printed circuit board 60. For example, groups of smoke detectors respectively mounted on ceilings of the respective stories are connected to a receiving station in parallel through the wiring 12.

The smoke detector described above operates as follows:

It is now assumed that a fire occurs within a building. Then the combustion products (thereafter referred to as "smoke") rise upwards and enters the smoke detector mounted on the ceiling through the flow passages 87 in the detecting portion 5 to enter into the dark box 70 while the light projecting element 77 within the dark box 70 is periodically pulsated by the lamp circuit 91. The light projected from the light projecting element 77 is scattered by the smoke flowing into the dark box 70, and the light receiving element 78 receives the scattered light. The detected signal by the light receiving element 78 is amplified by the amplifying circuit 99, and when the density of the smoke exceeds a predetermined threshold the switching circuit 93 is operated. The output of the switching circuit 93 is fed to the receiving station through wiring 12, the zone of the fire being indicated, and the fire alarm is given by warning devices located at various portions in the building. Simultaneously the response lamp 63 is turned on, indicating which smoke detector is operating.

For example, a control signal is supplied to the smoke detectors from the receiving station through the wiring 12 or special wiring to turn on the test switch 95 of the test circuit 94, lighting the test lamp 79. The light quantity irradiated is previously selected to be equal to light scattered in the dark box 70. When the light receiving element 78 received the light of the lighted test lamp 79, as in the case of a fire, a fire signal is supplied to the receiving station from the switching circuit 73 through the amplifying circuit 92. By the operation of the receiving station due to the fire signal, the operating condition of the smoke detector can be confirmed. The detecting portion 5 can be dismounted from the base portion 2, which is mounted on the ceiling 1, by rotating the detecting portion 5 counterclockwise relative to the base portion 2 for a definite angle. After the four setscrews 51 are loosened to dismount the head part 50, the electrically conductive side of the printed circuit board 60 is exposed to the outside so that a circuit test, etc., of the circuit elements can be carried out. When the cover 86 of the detecting portion 5 is dismounted together with the screen 85 for keeping out insects and the cover body 72 of the dark box 70 is pulled out the inside of the dark box 70 is exposed to the outside. As a result, moisture on the labyrinth 75 and dust accumulated on the screen 85 for keeping out insects can be removed.

Although there are only four setscrews 51 shown in the embodiment described above, the number may be increased or decreased as needed. Further, although the wiring 12 is connected to the terminal portions 30 of the base portion 2 after it has been mounted on the ceiling 1 it may also be possible to mount the base portion 2 on the ceiling 1 after the wiring 12 is connected to the terminal portions 30 thereof. Although the base portion 2 is described and shown to be an exposed type where it is externally mounted on the ceiling 1 the present invention also applies to a recessed type smoke detector in which the base portion 2 is embedded in the ceiling 1. Further, although in the embodiment described above and shown in the figures the terminal plates 37 are fixed to the terminal portions 30 of the base portion 2 by fastening screws 39, the terminal plates 37 may also be fixed by suitable means such as a force fit, etc., in place of the fastening screws 39.

From the foregoing it will be appreciated that the present invention can reveal various excellent effects as follows.

The light-scattering-type smoke detector in accordance with the present invention is composed of a detecting portion which comprises a head part removably mounted to the base portion, adapted to be secured to a ceiling, by means of setscrews, a printed circuit board fit in to the head part secured thereto by the setscrews with the circuit elements arranged on the upper surface thereof being connected to the terminal portions. A dark box composed of upper and lower portions put one upon another and adapted to be removealy mounted on the head part with the light projecting element and the light receiving element provided within it, and a dark box cover removably surrounding the dark box. As a result, since substantially all of the components can be disassembled maintenance and inspection can be carried out quite easily. Since the setscrews serve both as mounting fixtures and input/output terminals the number of parts can be reduced, the construction is simplified, and manufacturing costs can be reduced.

Further, in the present invention, since the base portion utilizes self-locking fixtures and the terminal plates are constituted so that the wiring can be inserted obliquely upwards the wiring and mounting operation is facilitated, and the constitution can be made more compact. Also, since the terminal plates are made to be fixed obliquely the radial distance of the base portion to be occupied by the terminal plates can be reduced, and the overall dimensions can be reduced more compact.

In addition, since the labyrinth around the dark box is provided with a test lamp the detecting part can be made compact, allowing also an easy operation for the operation test of the detecting part.

Since the terminal portions of the base portion are provided with protruded arcuate edges around the inner surface thereof and the spring plates, and the detecting portion is provided with setscrews each having a flange which acts both as an input/output terminal and a mounting fixture, the wiring and mounting operation facilitated and the overall dimensions reduced because there is no need to use screw terminals, knife fixtures or the like as conventionally required.

Thus, in accordance with the present invention a light-scattering-type smoke detector can be provided which has such advantageous features as allowing easy maintenance and inspection, etc.

It is to be understood that although a single preferred embodiment of the present invention has been illustrated and described it is not to be limited thereto except insofar as such limitations are included in the following claims:

What is claimed is:

1. A light-scattering-type smoke detector comprising a base portion to be secured to a ceiling and having terminal portions provided therein, a cylindrical head part adapted to be dismountably secured to said base part at said terminal portions by a corresponding number of setscrews and provided in the inner periphery with an annular stepped portion and at the lower end portion with a number of hooks, a cylindrical dark box comprising a body portion and a cover portion put one upon another, said body portion integrally provided with a printed circuit board thereon and a projecting flange portion therearound, said printed circuit board being fit into said annular stepped portion and secured to said head part by said setscrews, electrical elements arranged on the upper surface thereof being electrically connected to said terminal portion through said setscrews, said projecting flange engaging with said hooks of said head part, said dark box provided inside thereof with a light projecting element and a light receiving element, a labyrinth means formed at the outer periphery of said dark box so as to allow surrounding air to freely enter therein, but to prevent external light from passing through and a cover means for said detecting portion surrounding said dark box and having air inlets, said cover means detachably mounted to said dark box with hook pieces formed around said cover means engaging with key-shaped claw means formed around said dark box.

2. A light-scattering-type smoke detector as claimed in claim 1, wherein said base part is formed centrally with an opening for outgoing wiring with said terminal portions arranged around said outgoing opening, each of said terminal portions comprising a slanted terminal plate and a terminal spring plate having a substantially U-shaped cross section with a longer leg portion, said terminal portion having a self-locking capability.

3. A light-scattering-type smoke detector as claimed in claim 2 wherein said terminal plate is sloped so that said wiring pulled in through said outgoing opening may be inserted in a sloped condition.

4. A light-scattering-type smoke detector as claimed in claim 1, wherein said labyrinth formed around the outer periphery of said dark box is provided with a test lamp.

5. A light-scattering-type smoke detector as claimed in claim 1, wherein said base portion is provided around its inner peripheral wall with arcuate edges and terminal pieces of a spring material, and said setscrews have their respective upper ends constituted so as to from a flange, the flange adapted to be wedged and held between said arcuate edge and said terminal piece.

6. A light-scattering-type smoke detector as claimed in claim 2, wherein said terminal spring plate is made of a substantially H-shaped spring sheet with leg portions being longer than the head portions, a connecting portion between the head and leg portions being curved in a hairpin shaped so as to from an engaging portion, with said leg portions being further curved in a wavy shaped so as to constitute contacting pieces.

* * * * *